United States Patent [19]
Li et al.

[11] Patent Number: 5,723,963
[45] Date of Patent: Mar. 3, 1998

[54] APPARATUS AND METHOD FOR CONTROLLING TRANSITION BETWEEN PWM AND LINEAR OPERATION OF A MOTOR

[75] Inventors: Larry B. Li, Plano, Tex.; Chinh D. Nguyen, Sunnyvale, Calif.; Masimiliano Brambilla, San Jose, Calif.; Eugene Lee, Cupertino, Calif.; Athos Canclini, Santa Clara, Calif.

[73] Assignee: SGS-Thomson Microelectronics, Inc., Carrollton, Tex.

[21] Appl. No.: 488,370

[22] Filed: Jun. 7, 1995

[51] Int. Cl.⁶ .................. G05B 5/01; G05B 7/02
[52] U.S. Cl. .................. 318/590; 318/591; 318/611; 318/632
[58] Field of Search .................. 318/590, 591, 318/599, 620, 632, 611; 307/29, 38, 85, 86, 96–99

[56] References Cited

U.S. PATENT DOCUMENTS

| | | |
|---|---|---|
| 4,434,407 | 2/1984 | Healey, III et al. . |
| 4,491,744 | 1/1985 | Corey ............... 307/270 |
| 5,017,845 | 5/1991 | Carobolante et al. . |
| 5,117,123 | 5/1992 | Sendelweck . |
| 5,162,748 | 11/1992 | Katz . |
| 5,172,036 | 12/1992 | Cameron . |
| 5,191,269 | 3/1993 | Carobolante . |
| 5,191,270 | 3/1993 | McCormack . |
| 5,204,594 | 4/1993 | Carobolante . |
| 5,221,881 | 6/1993 | Cameron . |
| 5,223,772 | 6/1993 | Carobolante . |
| 5,293,445 | 3/1994 | Carobolante . |
| 5,294,877 | 3/1994 | Cameron . |
| 5,306,988 | 4/1994 | Carobolante et al. . |
| 5,309,078 | 5/1994 | Cameron . |
| 5,317,243 | 5/1994 | Cameron . |
| 5,329,560 | 7/1994 | Rastegar et al. . |
| 5,350,984 | 9/1994 | Carobolante et al. . |
| 5,374,857 | 12/1994 | Carobolante . |

*Primary Examiner*—Bentsu Ro
*Attorney, Agent, or Firm*—Theodore E. Galanthay; Lisa K. Jorgenson; Gordon H. Telfer

[57] ABSTRACT

A motor drive control circuit for operation in both linear and PWM modes includes a switchably connected compensation network. The compensation network has a capacitor that provides control loop compensation. To avoid transient effects during the settling time upon transitions from one mode to the other, the switch connecting the compensation network in the circuit is closed only during linear operation and not during PWM mode operation. When the switch is open, the capacitor holds a previously attained potential that is reapplied to the circuit when the switch is again closed.

21 Claims, 1 Drawing Sheet

APPARATUS AND METHOD FOR CONTROLLING TRANSITION BETWEEN PWM AND LINEAR OPERATION OF A MOTOR

BACKGROUND OF THE INVENTION

1. Field of the Invention

The present invention relates generally to motor control circuits and particularly to control loops for brushless DC motors that repeatedly transition between a Pulse Width Modulation (PWM) mode of operation and a linear mode of operation.

2. Description of Related Art

PWM techniques are of growing interest to operate brushless direct current (DC) motors in applications such as for disk drives and other rotating data media such as are found in computers. PWM techniques help to reduce power dissipation. In the PWM mode, the peak current is chopped to achieve maximum torque and to allow rapid accelerations. The control loop can be operated in a linear mode of operation during certain intervals to assist in maintaining motor speed control. Electrical transients are created each time a system transitions from one mode to the other. Transients can cause torque ripple in the motor. Even with a relatively large motor driving a relatively large load, where torque ripple has little effect, transients cause acoustical noise and increased power dissipation.

One previously proposed technique (U.S. Pat. No. 5,204,594, Apr. 20, 1993) provides a signal proportional to the average current flowing through coils of a motor operated in both linear and PWM modes. The prior circuit includes a sense resistor through which current in the coils flows and an output circuit switchably connected to receive a voltage developed by the sense resistor. The output circuit operates as a low pass filter circuit when drive current is supplied to the coils and operates as a voltage hold circuit when drive current is not supplied to the coils. Switching between the low pass filter circuit and the voltage hold circuit is provided by a switch circuit operating in response to PWM signals. In accordance with this technique, the average current in the load remains substantially the same in either mode to assist in smooth switching between modes. However, the prior technique does not directly address the problems of electrical transients occurring at transitions between modes.

SUMMARY OF THE INVENTION

It is now recognized that achieving smooth switching between the linear and PWM modes without unfavorable transients appearing in the motor control loop depends on a number of factors other than consistency of average current in the load. Among the other factors are the variation in bandwidth of the PWM and linear operating loops and the variability of initial charge conditions on capacitors or other compensation storage components in the circuit.

"Settling time" is the time required for any transients in the motor control loop, caused by switching between modes, to end. The technique of the above mentioned patent helped, through maintaining the same feedback (by control of average current), to reduce the settling time. It did not, however, eliminate it or reduce it as much as desired. It is now recognized the forward path in each of the two modes does not necessarily have the same gain. That forces a change in the operating point of the loop and, consequently, a non-zero settling time.

It is further recognized that reducing settling time may be more important to overall performance than the accuracy of matching average current in the two modes. Where a high degree of precision of motor speed control is desired, it can be advantageous to have frequent operation in the linear mode because in that mode signals are developed for speed control in accordance with known techniques involving sensing the "back emf" (or electomagnetic force) across a coil, when the particular coil is not energized and is "floating" at that point of operation, and utilizing zero crossing times of such back emf. Reliance on such use of the linear mode, which is advantageous despite greater power dissipation, requires frequent transitions from one mode to the other. It is desirable in some applications to use the linear mode once during each mechanical cycle of the motor.

In accordance with the present invention, the motor control loop utilizes a technique of disconnecting a compensation network, which is normally present and is utilized for the linear mode of operation, during the PWM mode and, additionally, using the capacitive components of the compensation network as a "sample and hold" element for the whole control loop.

The compensation network can be a series connected resistor and capacitor that in prior control loops for any periods of linear mode operation has a fixed connection in the control loop to compensate for inductive reactance. According to the invention, that compensation network is now switchably connected in the control loop. The switch connecting the network to the control loop is controlled to be closed during linear mode operation and open during PWM mode operation, so the compensation network is in the control loop only during the periods of linear mode operation. Preferably, the compensation network is connected during a maximum of linear mode operation.

The capacitive elements of the compensation network act somewhat in the manner of a "sample and hold" element for the whole loop by storing and preserving a potential representing operating conditions at the times it is disconnected and restoring them to the control loop when reconnected, but not being subject to transients occurring during mode transitions.

Settling time is reduced by the invention because when a transition from the PWM mode to the linear mode has taken place, the compensation network is then reconnected and the desired operating conditions have been preserved.

The invention is generally applicable to many high-gain loops where a large capacitive component is present for compensation (e.g. dominant-pole compensation) in a high impedance node. If the capacitive component were brought to saturation during a non-linear operation (e.g. PWM operation) it will have to slew back to its operating point when linear operation has to resume. The invention is particularly applicable to maintaining precise operation of such equipment as computer disk drives where repetitive transitions between the two modes of operation are made and where it is important to have both highly precise speed control and minimal electrical transients.

The present invention has advantages whether or not some other technique, such as that of the above-mentioned patent, is used to provide some degree of matching of the controlled currents. That is, different methods may be used for feedback or control that may, or may not, provide such matching to a high degree and the improvement in settling time provided by the present invention can be obtained independently of other aspects of the feedback or control circuitry which address other aspects of PWM or PWM/linear drives.

DESCRIPTION OF PREFERRED EMBODIMENTS

Figure 1:
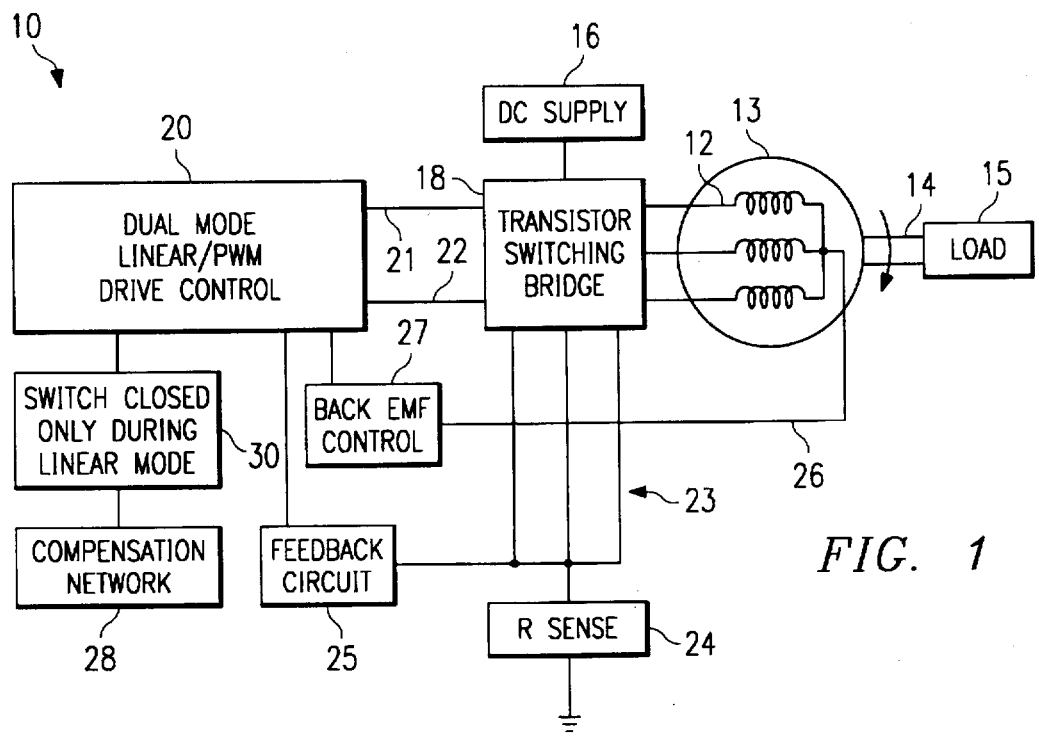
FIG. 1 is a schematic block diagram of a motor drive system for operation with transitions between PWM and linear modes with a general illustration of an example of the present invention.

A motor drive control system for operation with transitions between PWM and linear modes in accordance with this invention, wherein effects of settling time upon mode transitions are avoided, is illustrated in simplified form in FIG. 1. A drive circuit 10 is here shown for supplying energizing current to coils 12 which are, for example, coils of a three-phase direct current motor 13. Motor 13 has a rotating shaft 14 driving a mechanical load 15 which may be, for example, disks in a computer disk drive. In this example, drive circuit 10 includes a DC supply 16 for supplying voltage to a transistor switching bridge 18 that is under the control of a drive control circuit portion 20 which, in instances applicable to this invention, is one that controls, through bridge 18, coil current conduction during a set of intervals in a linear mode, continuously and without chopping, and during another set of alternate intervals in a pulse width modulation (PWM) mode. In the context of this invention, the intervals of operation in each mode may be as long or as short as desired.

FIG. 1 shows a line 21 from the dual mode control 20 that goes to the upper part of the bridge 18 to represent the three paths of drive signals respectively to three upper transistors (not shown here) in the bridge and a line 22 from the control 20 to the lower part of the bridge to represent the three paths of drive signals respectively to three lower transistors in the bridge. In accordance with known practice, multiplexed or sequentially commutated signals are supplied by the drive control 20 to the respective transistors.

Operation of the transistor bridge 18 may be in accordance with known practice. The bridge 18 provides three conduction paths 23 from the lower transistors of the bridge to a sense resistor (R sense) 24, which also has a connection to a reference potential or ground.

The drive control 20 has a number of inputs to it including in this simplified example, an input from a feedback circuit 25 that is coupled to the sense resistor 24 and provides a signal representing the coil current for control purposes in accordance with known practice.

Also, in this example, there is schematically shown a circuit path 26 from the common node of the coils 12 to a circuit portion labeled Back EMF Control 27 which in turn is connected to the drive control 20. The Back EMF Control operates in known manner and is here shown merely as an example of why it may be preferred to operate the drive 20 in each of the two modes: the linear mode to take advantage of Back EMF speed control, because zero crossing information is more accurate during the linear mode; and the PWM mode to take advantage, to the extent the linear mode is not preferred for other reasons, of lower power dissipation. For optimum operation, the time intervals of linear operation may be limited to intervals that enable most effective speed control while operating in the PWM mode at other times. For example, one brief period of linear operation for each mechanical revolution of the motor is sufficient.

FIG. 1 further shows a subcircuit 28 that is a compensation network that is switchably connected to the control loop 20 by a switch 30 that is closed only during linear mode operation.

The compensation network 28 is one that is for compensation of impedances during linear mode operation. Such networks were previously intended to remain in circuit throughout the PWM mode operation as well. With the recognition of the benefits to be obtained, now the compensation network is switchably connected in the circuit.

FIG. 1 also serves to illustrate the operating method of the invention, as well as its apparatus aspects, wherein transients upon mode transitions are avoided by disconnecting the compensation network 28 so it is not in circuit during PWM operation. Furthermore, the method involves retaining a significant charge, representing certain circuit conditions, on the compensation network 28 during the time it is not connected in circuit and reapplying it to the circuit upon reconnection for the benefit of the whole control loop.

Figure 2:
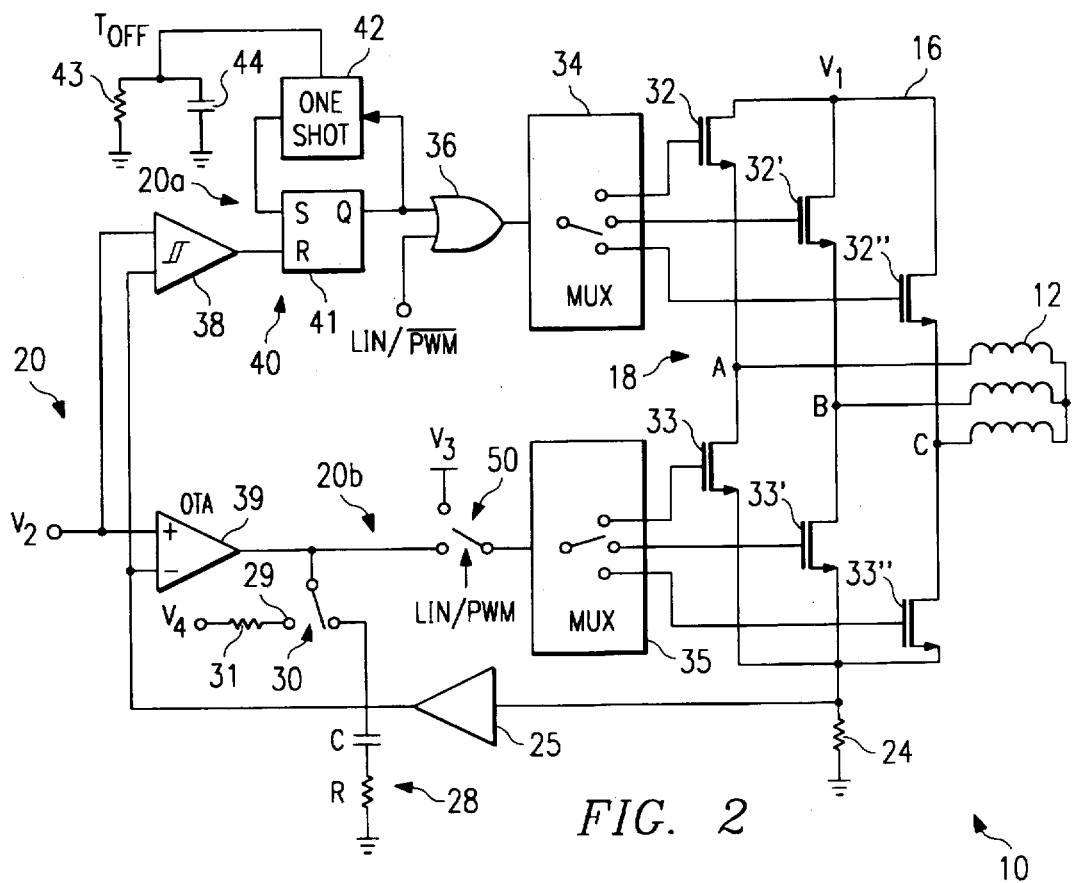
FIG. 2 is a schematic circuit diagram further illustrating an example of the present invention.

FIG. 2 illustrates a further example of an embodiment of the invention with a number of elements given reference numerals corresponding to similar elements of FIG. 1.

FIG. 2 gives an example of a transistor switching bridge 18 that is a conventional H-bridge, commonly referred to as a triple-½-H-bridge. The bridge 18 includes three upper transistors 32, 32' and 32" connected between the supply 16($V_1$) and respective coil winding nodes A, B and C. The bridge 18 also includes three lower transistors 33, 33' and 33" connected between the nodes A, B and C and a common connection with sense resistor 24.

Operation of bridge 18 to energize coils 2 is generally in accord with known practice and will not be described in full detail. The drive control circuit 20 is one that causes the transistors of bridge 18 to switch current to respective coil elements of coils 12 sequentially in linear and PWM modes.

The transistors 32 and 33 are power field effect transistors (such as D-MOS) which can be turned on for conduction between their sources and drains, or turned off, by the potential at their respective gate electrodes. Coil segments are energized in a known commutation sequence determined by the driver components connected to the gate electrodes. Those driver components include, in a driver portion 20a for the upper transistors 32, 32' and 32", a multiplexer (MUX) 34 for sequential switching to each of the three gates of the upper transistors. The upper multiplexer 36 is shown in this example receiving its input from a NOR gate 36 that has one input connected to a subcircuit 40 which receives an output from a comparator 38 whose inputs are a reference supply $V_2$ and a feedback signal from a feedback circuit or sense amplifier 25 connected with the sense resistor 24. The other input to the NOR gate is from a linear $\overline{PWM}$ mode signal source.

Subcircuit 40 includes a flip-flop 41 with a terminal R coupled to the output of comparator 38 and terminal Q connected to an input of NOR gate 36. The terminal Q is connected to an input to a "ONE SHOT" circuit portion 42. The output of the ONE SHOT circuit 42 is connected to terminal S of flip flop 41. The ONE SHOT circuit 42 is also connected to parallel connected resistor 43 and capacitor 44 which set the PWM off time or $T_{OFF}$. What is generally illustrated by subcircuit 40 of FIG. 2 is an example of circuitry for operation in "Fixed OFF Time (or $T_{OFF}$)" PWM (sometimes referred to as "peak detection and fixed OFF Time PWM").

It is known that operation in the PWM mode may be performed in either fixed $T_{OFF}$ PWM or in fixed frequency PWM and the specific details for operation in the two PWM types of operations may be in accordance with known practice. For purposes of understanding FIG. 2, it is the case that this example is one for fixed $T_{OFF}$ PWM operation (i.e., when in the PWM mode and not in the linear mode). That is relevant to how the switch 30 is connected when not closed to connect the compensation network 28.

It will be recognized that the circuit of FIG. 2 omits for the sake of simplicity some elements that may be provided in accordance with previously understood practice. For example, each conductor from the multiplex units 34 and 35 to the respective transistors may include a buffer, not shown here.

The lower transistors 33, 33', 33" of the bridge 18 also have a drive portion 20b connected to them through a multiplexer (MUX) 35 for sequential application of operative potential to their gate electrodes. As shown in this example, the lower multiplexer 35 receives an input from respective positions of a switch 50 according to mode of One input to switch 50 and the lower operation multiplexer 35 is from an OTA or operational transconductance amplifier 39 that has inputs from the reference $V_2$ and feedback circuit 25. Switch 50 is closed to connect the OTA 39 output to the MUX 35 during linear mode operation and during PWM operation is connected to a power supply V3.

The circuit branch having the OTA 39 output has connected with it a switch 30 for switchably connecting a compensation network 28 into the drive circuit. The switch 30 is controlled by a switch control (not shown) to be open (disconnected from network 28) except when the drive is running in the linear mode, and then to be closed to enable the compensation function of network 28 to be performed only during linear mode operation. The compensation network 28 includes a capacitor C and resistor R in series from switch 30 to ground. The capacitor C is of a size so it retains its potential upon disconnection by the switch until it is again connected.

The switch 30 normally has a second connection point 29 other than the connection to the output of the OTA. When the switch 30 is not closed to connect the network 28 in the control loop, the switch connects network 28 to point 29.

As explained above, the illustrated example includes fixed $T_{OFF}$ PWM operation. In that form of PWM operation, no compensation is required in the circuit. When the network 28 is not connected to the OTA, it is in this example, connected to a reference voltage $V_4$, such as through a resistor 31. The purpose is to retain the potential on the Capacitor C when it is not connected to the control circuit. An alternative is to have C connected to ground through a Zener diode which will prevent appreciable leakage from the capacitor.

In a dual mode circuit in which PWM mode operation is of the fixed frequency type, it is desirable to have compensation in the circuit during PWM operational. However, the compensation during fixed frequency PWM operation calls for an R-C network of different impedance values than that for the linear mode compensation network 28. In a typical network 28 for linear operation, C may be about 10 nanofarads and R about 10 kohms. Components for a compensation network for fixed frequency PWM operation may have values different by several times. Actual values depend on load characteristics and, possibly, other parameters. Therefore, in a circuit for linear and fixed frequency PWM operation, the control circuit may be connected, such as at the OTA output, to a PWM compensation network of appropriate values during PWM operation. Frequently, it is desirable for the PWM compensation components to be physically separated from those for network 28, for example by being in a separate chip.

It will be understood that the switches, such as 30 and 50, while illustrated in the manner of a mechanical switch for purposes of this schematic, preferably are solid state switches.

From the foregoing it is seen that by a relatively simple modification, the problem of settling time transients in transitions between modes is avoided. Consequently, one can have the advantages of linear mode operation, such as accurate detection of zero crossings in a back EMF speed control, and still have low power dissipation provided by the PWM mode during most of the operation. In addition, optimum compensation can be provided in each mode of operation.

The description given and embodiments shown are merely exemplary as the essential concepts of the invention may be implemented in other specific forms. As described herein, the drive circuit may be substantially provided in integrated chip form but it is optional to use discrete components.

What is claimed is:

1. A motor drive control system for operation in both linear and PWM modes with minimized effect of transients upon transitions between modes, comprising:

a drive circuit for supplying energizing current to motor coils during a first set of time intervals in the linear mode and during a second set of time intervals, that occur between the intervals of the first set, in the PWM mode;

said drive circuit including a compensation network that is switchably connected in the drive circuit during intervals of linear mode operation and not during periods of PWM mode operation.

2. A motor drive control system in accordance with claim 1 wherein:

the compensation network comprises a capacitor that retains a potential during the periods the compensation network is not connected and that is reapplied to the drive circuit for control functions when the network is reconnected.

3. A motor drive control system in accordance with claim 2 wherein:

the drive circuit repeatedly switches between the two modes and is connected with a back EMF speed control circuit portion that provides motor speed control and is operational during drive circuit operation in the linear mode.

4. A motor drive control system in accordance with claim 1 wherein:

the motor coils are stator coils of a brushless DC motor connected in a Y configuration and the motor is part of a computer disk drive.

5. A method of operating a motor drive control system with transitions between linear and PWM modes, comprising:

connecting a capacitive compensation element in an electrical circuit to the system when a transition from the PWM mode to the linear mode occurs;

disconnecting the capacitive compensation element from the circuit when a transition from the linear mode to the PWM mode occurs; and holding a potential on the capacitive compensation element during the time it is disconnected and reapplying that potential to the circuit when the element is again connected in the circuit.

6. A method of operating a motor drive control system in accordance with claim 5 further comprising:

setting the intervals of linear mode operation to provide motor speed control by use of signals representing back EMF of coils of a motor with which the drive control system is connected.

7. A method of operating a motor drive control system in accordance with claim 5 wherein:

the connecting of the capacitive compensation element to the system for linear mode operation is performed when disconnecting the capacitive element from a circuit branch provided for retaining potential on the capacitive element during PWM mode operation and the disconnecting of the capacitive compensation element for PWM mode operation is performed when reconnecting the capacitive element to said circuit branch for retaining potential.

8. A method of operating a motor drive control system in accordance with claim 7 wherein:

the drive system operation in the PWM mode is performed as fixed OFF-time PWM operation.

9. A method of operating a motor drive control system in accordance with claim 7 wherein:

the drive system operation in the PWM mode is performed as fixed frequency PWM operation and a separate circuit branch is connected to the system during PWM mode operation comprising an additional compensation element.

10. A motor drive control circuit for operation alternatively in a linear mode and in a pulse width modulation (PWM) mode, comprising:

motor coils connected to be sequentially energized by application of drive signals to a transistor switching bridge;

means for supplying the drive signals in a linear mode during first intervals and in a PWM mode during second intervals with repeated transitions from the linear mode to the PWM mode and from the PWM mode to the linear mode;

said means for supplying the drive signals comprising a compensation network, for compensating for inductive reactance, connected by a first switch means at a connection point in the control circuit only during linear mode operation.

11. A motor drive control circuit in accordance with claim 10 wherein:

said means for supplying the drive signals includes means for PWM mode operation in accordance with fixed OFF-time PWM and the compensation network is connected to a circuit branch for retaining the potential of the compensation network reference during PWM mode operation until the next interval of linear mode operation.

12. A motor drive control circuit in accordance with claim 10 wherein:

the motor coils are stator coils of a brushless DC motor connected in a Y configuration and the motor is part of a computer disk drive.

13. A motor drive control circuit in accordance with claim 10 wherein:

the transistor switching bridge comprises three upper transistors and three lower transistors with intermediate connections to the motor coils to form three current paths between a source of DC voltage and ground, each path including one of the upper transistors of the bridge, one or more segments of the motor coils and one of the lower transistors of the bridge.

14. A motor drive control circuit in accordance with claim 13 wherein:

said means for supplying the drive signals comprises means for multiplexing drive signals to the respective upper and lower transistors; the means for multiplexing drive signals to the respective lower transistors is coupled to the output of an operational transconductance amplifier (OTA) through an additional switch means; the additional switch means is connected to switch control means for making a connection between the OTA and the means for multiplexing only during linear mode operation and for making a connection between the means for multiplexing and a supply voltage during PWM mode operation; and the first switch means for connection of the compensation network during linear mode operation is connected at the output of the OTA.

15. A method of operating a primary electrical circuit that operates, alternatively, in linear and nonlinear modes comprising:

connecting a signal storage element in the circuit for compensation of impedances in the linear mode of operation;

disconnecting the signal storage element so it is absent from the circuit during the nonlinear mode of operation and time for settling transients on mode transitions is reduced; and reconnecting the signal storage element for compensation during the linear mode of operation following operation in the nonlinear mode with the signal storage element having stored a signal representing operating conditions at the time of disconnecting.

16. A method in accordance with claim 15 wherein:

the disconnecting, and reconnecting, of the signal storage element is performed automatically according to when the circuit senses operation, and cessation of operation, in the nonlinear mode.

17. A method in accordance with claim 15 wherein the primary electrical circuit is a drive circuit for a load that during nonlinear operation is supplied with drive pulses.

18. A method in accordance with claim 17 wherein the load is a motor operated in a nonlinear mode by pulse-width modulation.

19. A drive circuit for a load comprising:

means for driving the load in a linear mode during intervals separated by a nonlinear mode interval;

means for connecting a signal storage element in the circuit for compensation in the linear mode of operation, disconnecting the signal storage element so it is absent from the circuit during the nonlinear mode of operation, and reconnecting the signal storage element for compensation during a next interval of linear mode operation, the signal storage element retaining a signal representing linear mode operating conditions between intervals of linear mode operation;

said means for connecting, disconnecting, and reconnecting being operated at times determined according to when the circuit senses operation, and cessation of operation, in the respective modes.

20. A drive circuit according to claim 19 wherein:

the means for the driving in the respective modes includes nonlinear mode operation by pulse width modulation.

21. A drive circuit in accordance with claim 20 wherein:

the load is a motor for driving a mechanical data storage medium.

* * * * *